March 16, 1954  B. BARÉNYI  2,672,317
JACKING ARRANGEMENT FOR VEHICLES
Filed Dec. 3, 1949  2 Sheets-Sheet 1

INVENTOR:
BÉLA BARÉNYI
By:
Hazeltine, Lake & Co.
AGENT.

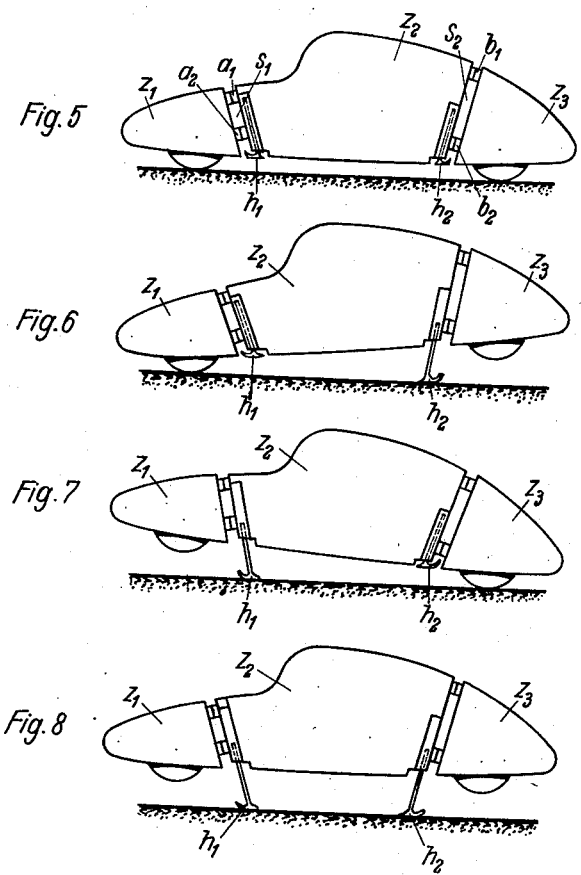

Patented Mar. 16, 1954

2,672,317

UNITED STATES PATENT OFFICE 2,672,317

JACKING ARRANGEMENT FOR VEHICLES

Béla Barényi, Stuttgart, Germany

Application December 3, 1949, Serial No. 130,989

Claims priority, application Germany December 11, 1948

2 Claims. (Cl. 254—86)

The present invention relates to an improved arrangement of jacks on vehicles, particularly motor vehicles.

The jacks thus far arranged on vehicles are provided with a lifting member movable in axial direction. They are substantially placed on the vehicle in such a way that, when the vehicle is in normal position (i. e. not raised), their axes are perpendicular to the road. Yet, this arrangement is disadvantageous in that when one axle of the vehicle is being lifted by the jack (whereas the other axle of the vehicle acts as a fulcrum), the distance between the line of contact of the wheels resting on the ground and the point of support of the jack increases, thus causing either the foot of the jack to skid or (as far as possible) to tilt, or else the car to move by a certain amount from the point of support of the jack.

Figure 1:
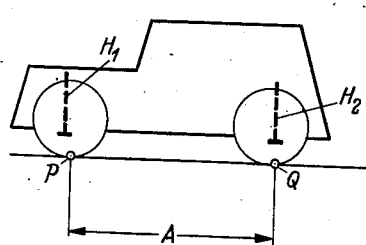
Figure 2:
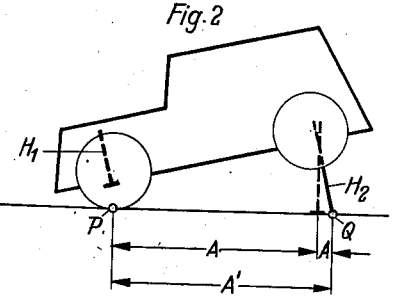
Figure 3:
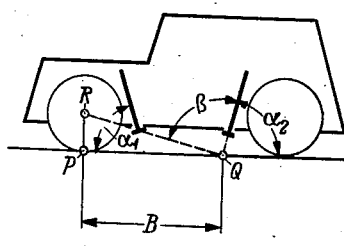
Figure 4:
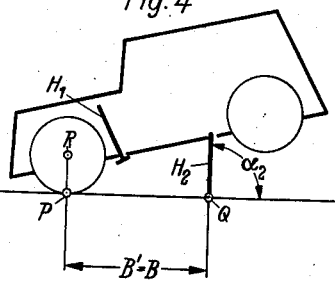

In the accompanying drawings Figs. 1 and 2 are diagrammatic side views of known arrangements of vehicle jacks shown respectively in retracted and extended positions; Figs. 3 and 4 are views similar to Figs. 1 and 2 of vehicles provided with jacks according to the present invention; and Figs. 5 to 8 are views, in Figs. 5 and 6 similar to those of Figs. 1 and 2 or Figs. 3 and 4, and in Fig. 7 of front jacks and in Fig. 8 of both front and rear jacks shown in extended position, as applied to a vehicle of special construction, in accordance with the present invention.

The disadvantages of the known jacks are diagrammatically illustrated by the drawing, Fig. 1 and Fig. 2. Suppose $H_1$ is a jack arranged at the front axle, and $H_2$ a jack arranged at the rear axle. Let moreover e. g. the letter A stand for the distance between the axis of the rear jack $H_2$ and the point of contact P of the front wheels with the road. By operating the jack $H_2$, the distance from P to the point Q, where jack $H_2$ rests on the ground, will increase by $\Delta A$ from A to A'.

Due to the horizontal shearing forces coming herein into existence, the jack is subjected to considerable strains and runs the risk of breaking or slipping out of its guide. These precarious safety conditions are a danger e. g. for the mechanics working under the vehicle. Owing to the oblique position the jack takes up when the vehicle is jacked up, it is moreover necessary to extend or/and to strengthen the guide of the jack, which entails an additional use of material and space.

The object of the invention is to remove this disadvantage and consists essentially in that, when the vehicle is not raised, the lifting direction of the jack follows a line which is inwardly inclined to the floor, i. e. in such a way that the extended jack axis intersects the transverse center plane of the vehicle (i. e. the transverse plane which lies in the middle between the wheel axles and is perpendicular to the direction of motion of the vehicle) under the floor level.

The arrangement according to the invention is for instance illustrated by Fig. 3 and Fig. 4 in the drawing. Herein, when the vehicle (Fig. 3) is in normal position, the jacks $H_1$ and $H_2$ converge in direction of the road at angles $a_1$ and $a_2$, respectively, in such a way that the extensions of their axes intersect the transverse center plane of the vehicle under the floor level. These angles $a_1$ and $a_2$ are suitably chosen in such a way that when one of these jacks is being operated (e. g. $H_2$), the point of support Q keeps as constant a distance as possible from the wheel center R of the opposite (e. g. the front) set of wheels. This is substantially the case when the axis of the jack is a tangent to the radius drawn from R to Q, i. e. when $\beta = 90°$. When the vehicle (e. g. its rear axle) is raised, the axis of the jack is almost at right angles ($a'_2$) to the floor. The distance $B' = PQ$ remains nearly constant ($\sim B$).

The advantage of this arrangement consists in that it substantially prevents movement of the vehicle or shifting of the point of support of the jack. At the same time the supporting forces are taken up under particularly favorable conditions by the jack due to its nearly perpendicular position to the ground when one half of the car is raised. Herein, the arrangement may also be set up a priori in such a way that when the vehicle (Fig. 4) is jacked up into this position, the angle between the axis of the jack and the ground $a'_2$ equals 90° or is a predetermined size of nearly 90°.

It is to be noted, however, that in view of the fact that the lifting operation of the vehicle entails an extension of the jack in its slide, it is theoretically impossible to maintain the distances RQ and B, respectively, accurately constant. However, by arranging the jack in an oblique position according to the invention, the variations of these distances are reduced to a minimum. This action can moreover be upheld according to the invention by placing the jack within the wheel base, with the result that the same travel of the axle to be lifted will be performed with a shorter stroke of the respective jack according to the smaller lever arm.

Also the horizontal shifting of the supporting point Q relatively to the point R or P, respectively (e. g. in comparison to a placement of the jacks at the axles according to Figs. 1 and 2), will thus be reduced correspondingly.

It is true that when the front and rear axles are simultaneously lifted by operating the two jacks the arrangement according to the invention has, in comparison to the arrangement known, the disadvantage that there occurs a longitudinal shifting of the supporting points relative to each other. However, as it is seldom necessary to lift simultaneously the two axles, and jacks are by far mostly utilized for the lifting of one axle only, this disadvantage may unhesitatingly be put up with in consideration of the advantages obtained by the invention.

The invention provides moreover an arrangement of the jack within the wheel base (e. g. at ⅓ to ½ the distance between the vehicle axis and the transverse center plane of the vehicle). The advantage of this arrangement consists in a reduction of the stroke of the jack and of the possibly unavoidable differences in the movement ratios.

Another object of this invention consists in an arrangement of the jacks on vehicles manufactured according to the cell construction method. The jacks are herein arranged within the area of the interstices (gaps) existing between the cells, for instance in the gaps themselves or in their immediate neighborhood. Particularly where the interstices diverge upward—which, as a rule, is of particular advantage for the building of the car body from both the points of view of construction and space—such an arrangement results in a particularly effective action of the jack according to the purpose of above outlined invention. Further advantages are illustrated by the following descriptions of Figs. 5 to 8, which show diagrammatically how such a vehicle of the cell type behaves when operating the jacks.

Suppose the vehicle represented in Figs. 5 to 8 consists of the cells $Z_1$, $Z_2$ and $Z_3$ assembled in some way at $a_1$, $a_2$ and $b_1$, $b_2$, and the assemblage interstices or gaps resulting are $S_1$ and $S_2$, respectively. The middle cell $Z_2$ is provided with the jacks, $h_1$ and $h_2$, arranged in the immediate neighborhood of the gaps, e. g. in such a way that the jacks remain in their recesses also when not in operation. These jacks may be operated at will mechanically, hydraulically, pneumatically, electrically or the like e. g. by means of a piston or rack.

These jacks may suitably be provided in pairs arranged, if required, on the same transverse plane, so as to render it possible to lift the vehicle axle involved in a uniform and stable fashion. In this case these sets of jacks can be operated jointly, e. g. from the side by means of a transverse shaft or the like.

Fig. 5 shows a vehicle in normal position with jacks $h_1$ and $h_2$ retracted. Fig. 6 shows the same vehicle with jack $h_2$ extended so that the rear wheels clear the ground. In Fig. 7, on the contrary, the front part of the vehicle is raised together with its front wheels by extending jack $h_1$. Further, Fig. 8 shows the lifting of the whole vehicle by the simultaneous extension of the two jacks.

An arrangement of the jacks particularly suitable is furthermore obtained when after removing the cell (e. g. $Z_1$) opposite to the jack (e. g. $h_2$) the cells ($Z_2$, $Z_3$) close to the jack are kept in balance by the jack ($h_2$) extended (operated) in such a way that either the one or (after a joint, simultaneous swivelling of the two cells about the point of support of the jack) the other cell is still supported by the ground and supports in turn the other cell in a suspended fashion (as a cantilever). Some specific works, such as for instance assembly, repair etc. may hereby be rendered considerably easier under certain circumstances particularly in cases where supporting is chosen in such a way that the assembled cells assembled rest on the floor in either of the two supporting positions with nearly the same tilting moment around the supporting point. Under certain circumstances, also jacking up of the two cells (e. g. $Z_2$, $Z_3$) by means of the jack ($h_1$) arranged at the free assembly gap may be of advantage for assembly and repair works.

What I claim is:

1. The combination of a vehicle having at least two pairs of wheels spaced apart in the longitudinal direction of the vehicle, a jack rigidly mounted on said vehicle in the space between the axes of said pairs of wheels for straight-line downward extension and adapted to elevate all but one of said pairs of wheels off a supporting surface, said jack being mounted at such an angle, with respect to the longitudinal axis of said vehicle, that the direction of its movement is substantially perpendicular to a plane extending through the axis of said one pair of wheels and the point of support of the jack when said jack is extended to first contact the supporting surface, and the stroke of the jack after contact with the supporting surface being of a length equal to the radius of said one pair of wheels.

2. The combination of a vehicle comprising two opposite end sections each having at least one pair of wheels and a central section between said end sections and detachably connected with and supported by said end sections so that said pairs of wheels on the end sections are spaced apart in the longitudinal direction of the vehicle, said end sections being joined to said central section along inclined planes which converge downwardly, and jacks rigidly mounted on said central section adjacent said inclined planes and parallel to the latter for straight-line downward extension, the jacks at each end of said central section being adapted to elevate all but a pair of wheels on the end section at the opposite end of the vehicle off a supporting surface, each of said jacks being mounted at such an angle, with respect to the longitudinal axis of the vehicle, that the direction of its movement is substantially perpendicular to a plane extending through the axis of said pair of wheels on the opposite end section and the point of support of the jack when said jack is extended to first contact the supporting surface, and the stroke of each jack after contact with the supporting surface being of a length equal to the radii of said pair of wheels on the opposite end section.

BÉLA BARÉNYI.

References Cited in the file of this patent
UNITED STATES PATENTS

| Number | Name | Date |
| --- | --- | --- |
| 1,266,409 | Cohen | May 14, 1918 |
| 1,432,726 | Petersen | Oct. 17, 1922 |
| 1,840,258 | Schafer | Jan. 5, 1932 |
| 1,974,705 | De Vaal | Sept. 25, 1934 |
| 2,181,907 | Moffat et al. | Dec. 5, 1939 |
| 2,478,653 | Callan | Aug. 9, 1949 |
| 2,523,962 | Mahaffey et al. | Sept. 26, 1950 |
| 2,612,230 | Jezler | Sept. 30, 1952 |

FOREIGN PATENTS

| Number | Country | Date |
| --- | --- | --- |
| 486,968 | Great Britain | June 14, 1938 |